United States Patent [19]
Case

[11] 3,711,050
[45] Jan. 16, 1973

[54] UNIVERSAL TAILPIPE BRACKET
[75] Inventor: David A. Case, Prior Lake, Minn.
[73] Assignee: Tenneco Inc., Racine, Wis.
[22] Filed: Feb. 9, 1971
[21] Appl. No.: 113,955

[52] U.S. Cl. ................... 248/74 R, 248/221, 248/300
[51] Int. Cl. .............................................. F16l 3/10
[58] Field of Search ...... 248/74 R, 74 A, 65, 66, 221, 248/43, 300

[56] References Cited

UNITED STATES PATENTS

| | | |
|---|---|---|
| 3,199,815 | 8/1965 | Martinkovic et al. ............ 248/221 X |
| 3,606,217 | 9/1971 | Leiferman .......................... 248/57 X |
| 1,904,330 | 4/1933 | Ruff ................................ 248/74 R X |
| 2,884,670 | 5/1959 | Garrison .............................. 248/221 |

*Primary Examiner*—Chancellor E. Harris
*Attorney*—Harness, Dickey & Pierce

[57] ABSTRACT

A specially shaped bracket, designed for use in the mounting of automotive tailpipes or exhaust pipes, has flange sections that enable it to be attached on the one hand to the body or chassis of an automobile and on the other hand to a pipe clamp in a wide variety of arrangements thereby standardizing the pipe mounting structures and consequently reducing the cost thereof.

9 Claims, 4 Drawing Figures

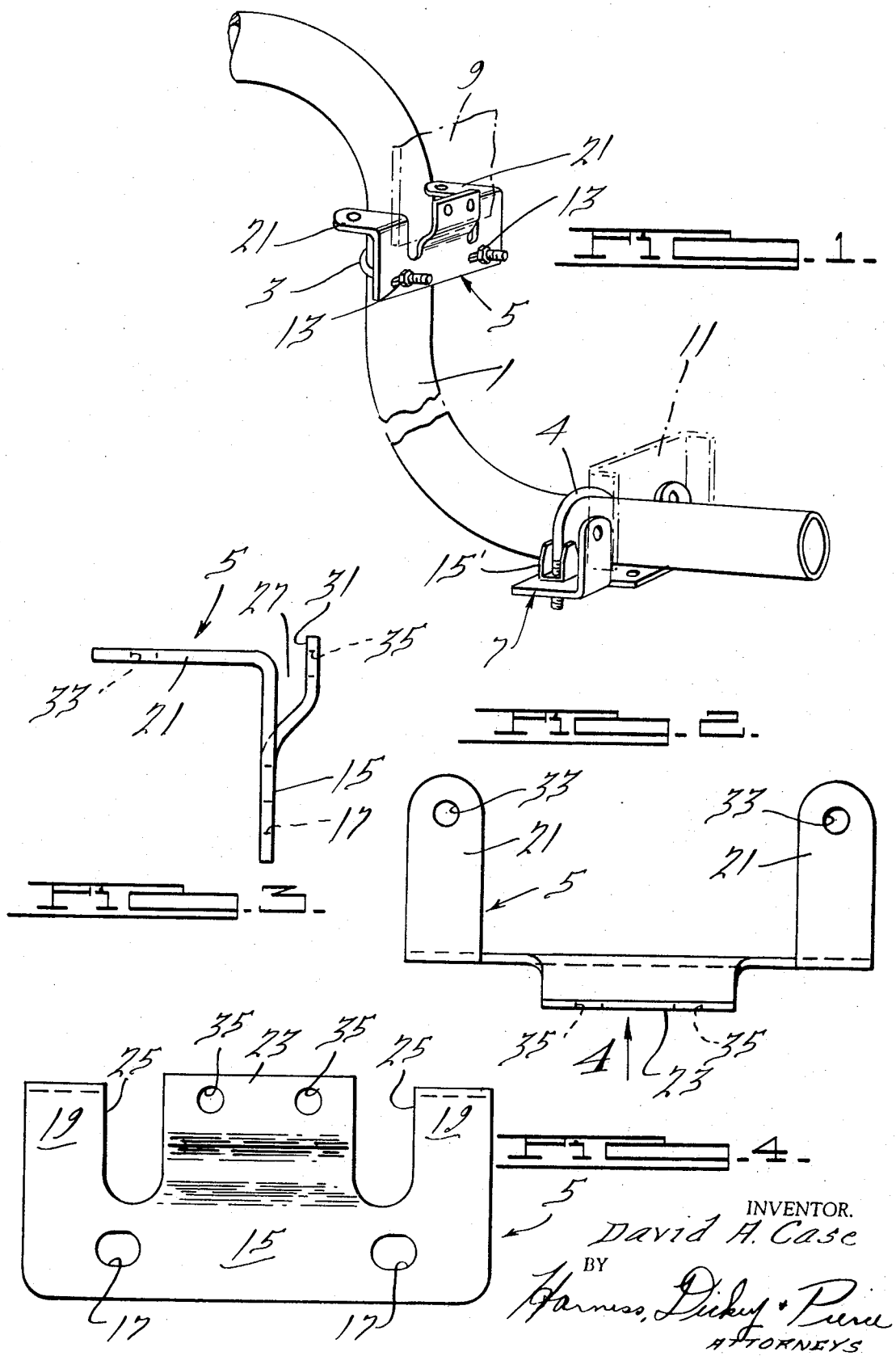

UNIVERSAL TAILPIPE BRACKET

BACKGROUND OF THE INVENTION

The exhaust pipe and tailpipe sections of the modern automobile exhaust system are of intricate shape due to the requirement that they fit in spaces that are available after the design of the automobile has been completed. These sections must be secured to the underbody or the chassis of the automobile and the points on the automobile capable of receiving a pipe attaching bracket are not often located in such a manner as to make mounting a simple problem. Consequently, in the past, it has been customary or necessary on each model of automobile to use a variety of clamp structures or to weld brackets to the tailpipe or exhaust pipe thereby increasing the pipe cost and making them more difficult to handle and to put in place.

BRIEF SUMMARY OF THE INVENTION

It is the purpose of this invention to devise a bracket configuration of such a nature that one bracket may be substituted for many brackets or mounting means of the type heretofore used.

The invention accomplishes this by means of a specially formed sheet metal bracket that has mounting flanges extending at right angles to each other and which includes a space between certain of the flanges through which the tailpipe or exhaust pipe can extend. The bracket includes openings that will receive the usual U-shaped wire pipe clamp which can be bolted in place on the bracket to firmly secure the pipe to the bracket.

DESCRIPTION OF THE DRAWINGS

FIG. 1 is a perspective view, with parts of the automobile shown in phantom lines, of a section of an exhaust system conduit clamped to two brackets constructed in accordance with the invention;

FIG. 2 is a plan view looking down on the top of the upper bracket shown in FIG. 1;

FIG. 3 is a side elevation of the upper bracket of FIG. 1; and

FIG. 4 is a front elevation of the bracket of FIG. 1 or a view taken from the point 4 of FIG. 2.

DETAILED DESCRIPTION OF THE INVENTION

In FIG. 1 the bent exhaust gas conduit 1 for an automotive exhaust system is clamped by means of U-shaped wire clamp members 3 and 4 to brackets 5 and 7 which in turn are bolted, respectively, to a hanger member 9 and a frame member 11 of the automobile. Clamp 3 is secured firmly to the bracket 5 by nuts 13 which thread on its ends and clamp 4 is secured in a similar manner to the bracket 7, the clamp 4 also extending through a convenient saddle structure 15'. The brackets 5 and 7 are identical in structure and FIG. 1 merely shows them disposed in different positions so as to illustrate the universal nature of the bracket structure. Thus, reference herein to the bracket 5 is to be construed as a description also of the bracket 7.

The bracket 5 is formed by pressing, piercing, and folding operations from strips of sheet metal, preferably low carbon steel. It includes a base section 15 which extends across the full width of the bracket and contains two oblong holes or slots 17 which in the usage illustrated in FIG. 1 serve as the apertures that receive the ends of the U-shaped clamps 3 and 4. At opposite ends of the base section 15 are leg sections 19 which lie in the plane of the base section 15. The leg sections 19, however, have end flanges 21 which extend at right angles to the sections 19 and the base section 15. The flanges 21 are of substantial length, as seen in FIGS. 2 and 3, their lengths being substantially the same as the height of the bracket as seen in FIG. 4.

Projecting upwardly from the flat portion of the base section 15 is a tongue in the form of a central attachment flange portion 23 which is separated from the leg sections 19 by the cutouts 25. As seen best in FIGS. 2 and 3, the flange 23 is offset from the plane of the base 15 and leg sections 19 so as to provide a space or slot 27 between the inner face 31 of the offset and the plane of the leg sections 19. The offset 23 preferably extends a slight distance above the end flanges 21 as seen best in FIGS. 3 and 4.

The end flanges 21 have holes 33 formed in them near their ends and the flange 23 has similar holes 35 formed in it adjacent its outer edge which, by virtue of the extension of flange 23 are aligned with flanges 21 as seen in FIG. 3. The holes 33 and 35 are of size to pass bolts or screws that may be used to tightly secure the bracket 5 in position on the hangers or frame members (such as 9 or 11) of the automobile.

As seen in the illustrated usages of FIG. 1, the pipe is clamped tightly against the base section 15 and either the end flanges 21 or the central flange 23 is used as the mounting means to secure the bracket to a hanger or frame member. In the upper support of FIG. 1 a central flange 23 is used as the attachment section and it will be seen that the hanger 9 fits in the gap 27 so that the bracket embraces its bottom edge. In the arrangement of the lower bracket 7 of FIG. 1 the end flanges 21 are attached to the frame member 11 and the central flange 23 is located in a non-interfering position.

It will be apparent that the bracket of this invention may be positioned and attached to the frame in a wide variety of ways and that the clamps 3 and 4 may be secured to a wide variety of positions on pipe 1. The bracket design enables it to be used in different positions to mate up with all of the various pipe support members provided on certain make automobiles for a several year period, thus eliminating the need to use different pipes with different welded-on brackets for each year automobile and effecting a large inventory savings of replacement parts.

Modifications and variations may be made without departing from the spirit and scope of the invention.

I claim:

1. A mounting bracket for an automotive tailpipe or exhaust pipe comprising a member having a base section and a support section extending at substantially a right angle to the base section, said support section having attachment holes with axes substantially parallel to the base section and said base section having attachment holes with axes substantially parallel to the support section, said base section having holes therein to receive a clamp for securing a pipe to the base section, said support section comprising spaced legs at opposite ends of the base section, said base section having a central attachment flange located between said legs and offset from the plane of the base section in a direction opposite to the support section, said base section attachment holes being formed in said offset flange.

2. A bracket as set forth in claim 1 wherein said holes in the attachment flange are substantially in planar alignment with the support section.

3. A mounting bracket for an automotive tailpipe or exhaust pipe or the like comprising a member having a base section and a support section extending at substantially a right angle to the base section, said support section having attachment holes with axes substantially parallel to the base section and said base section having attachment holes with axes substantially parallel to the support section, said base section having holes therein to receive a clamp for securing a pipe to the base section, said base section having an attachment flange formed therein and substantially parallel to but offset from the plane of the base section in a direction opposite to the support section, said base section attachment holes being formed in said offset flange.

4. A mounting bracket for an automotive tailpipe or exhaust pipe or the like comprising a member having a substantially flat base section and a first support section extending at substantially a right angle to the base section, said member having a second support section extending substantially parallel to said base section and offset therefrom in a direction opposite to the first support section, said first support section having attachment holes with axes substantially parallel to the base section and said second support section having attachment holes with axes substantially parallel to the first support section, said base section having holes therein to receive a clamp for securing a pipe to the base section.

5. A bracket as set forth in claim 4 wherein said first support section comprises spaced legs at opposite ends of the base section and on opposite sides of said second support section.

6. A bracket as set forth in claim 4 wherein said member comprises a single integral piece of sheet metal and the first support section is bent in one direction from said base section and said second support section is bent in the opposite direction from said base section.

7. A mounting bracket for an automotive tailpipe or exhaust pipe or the like comprising a member having a base section and a pair of leg sections located respectively at opposite ends of the base section, said leg sections having end flanges extending at substantially right angles to the base section, said end flanges having attachment holes with axes substantially parallel to the base section, said member having central attachment flange located between and separated from the leg sections and offset from the plane of the base section to provide a slot between it and the leg sections, said attachment flange having attachment holes with axes substantially perpendicular to the base section, said base section having holes therein to receive a clamp for securing a pipe to the base section.

8. A bracket as set forth in claim 7 wherein said end flanges have a length substantially the same as the height of the base section.

9. A mounting bracket for an automotive tailpipe or exhaust pipe or the like comprising a member having a substantially flat base section and substantially flat first and second support sections extending at substantially right angles to each other, said first support section having first attachment holes with axes substantially parallel to the base section, said second support section having second attachment holes with axes substantially parallel to the first support section and defining a plane substantially parallel to the plane of the first support section, said base section having holes therein to receive a clamp for securing a pipe to the base section and with axes substantially parallel to the axes of said second attachment holes.

* * * * *